Nov. 6, 1956  A. D. F. MONCRIEFF  2,769,375
HOBBING MACHINE

Filed March 28, 1951  13 Sheets-Sheet 1

INVENTOR.
Alexander D. F. Moncrieff
BY
Harness, Dickey & Pierce
ATTORNEYS.

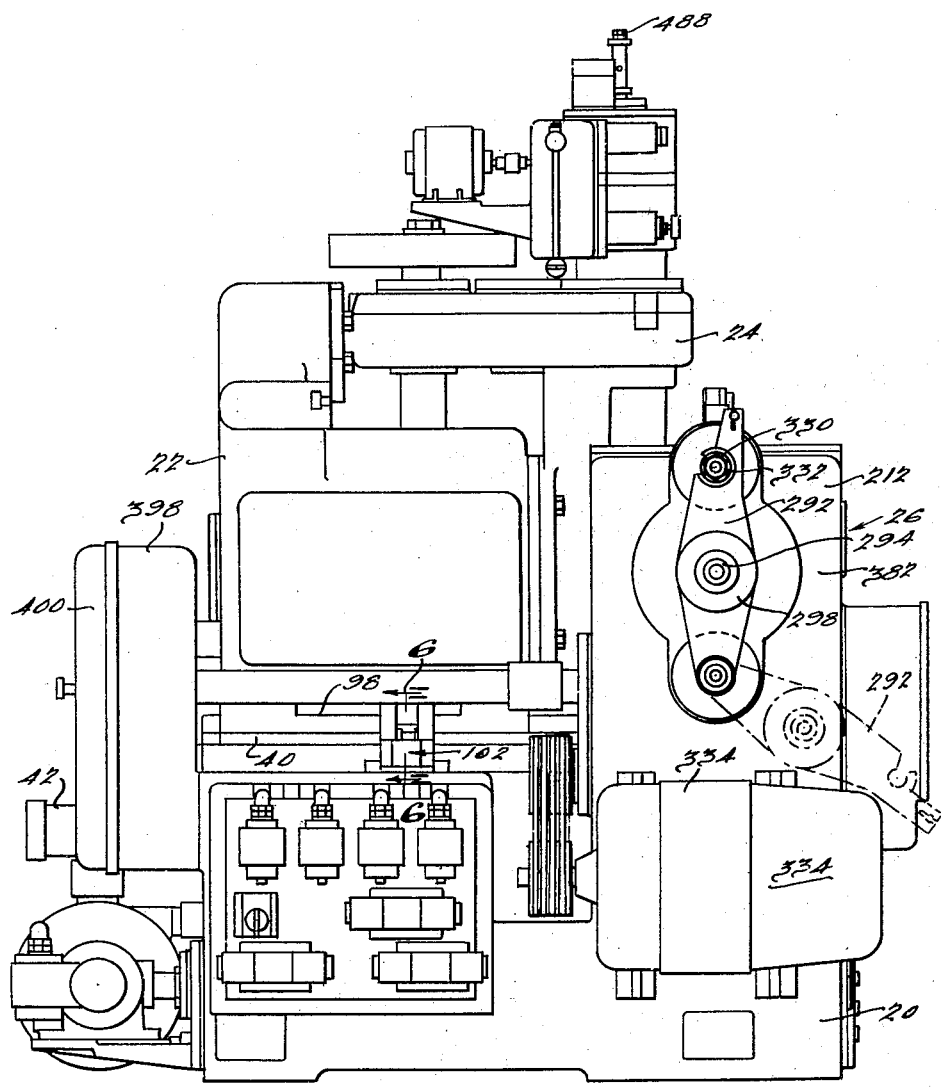

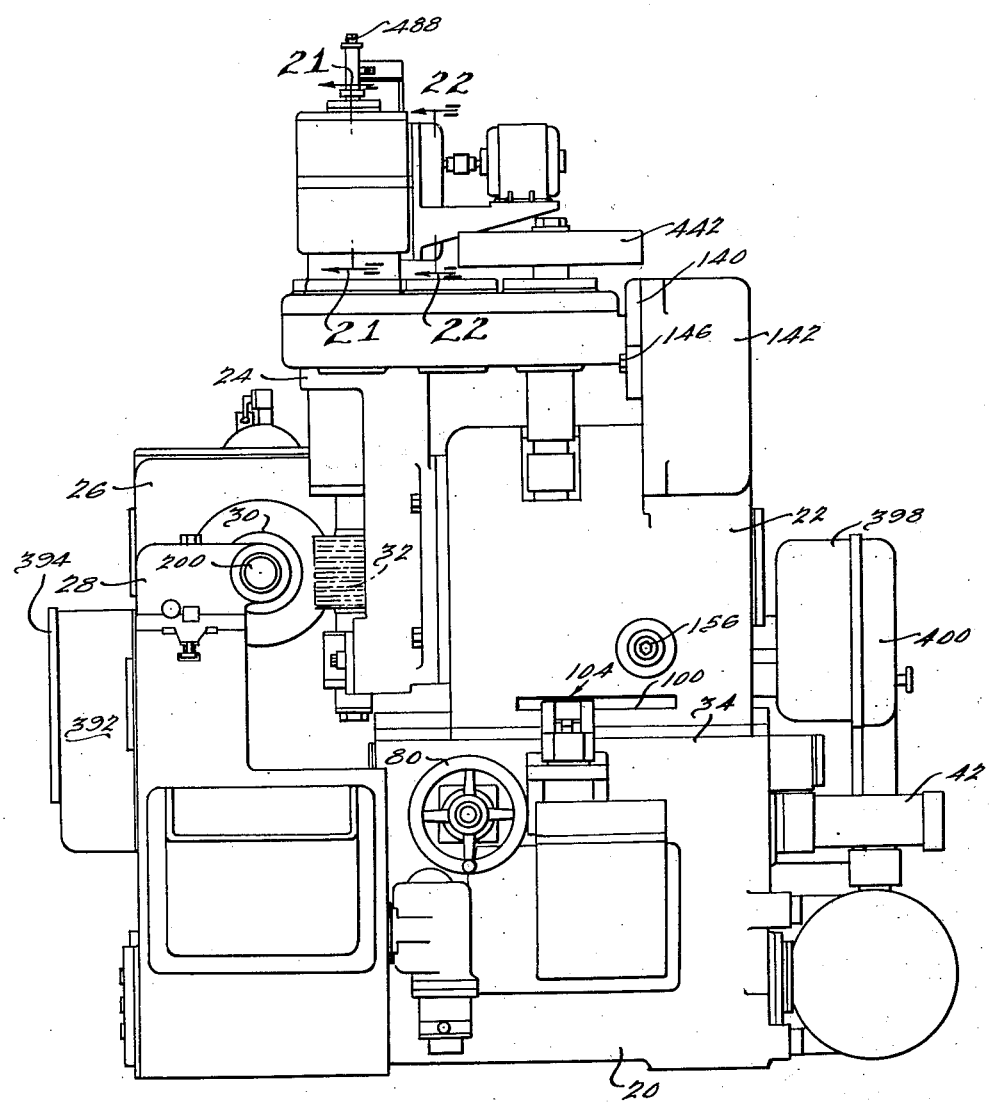

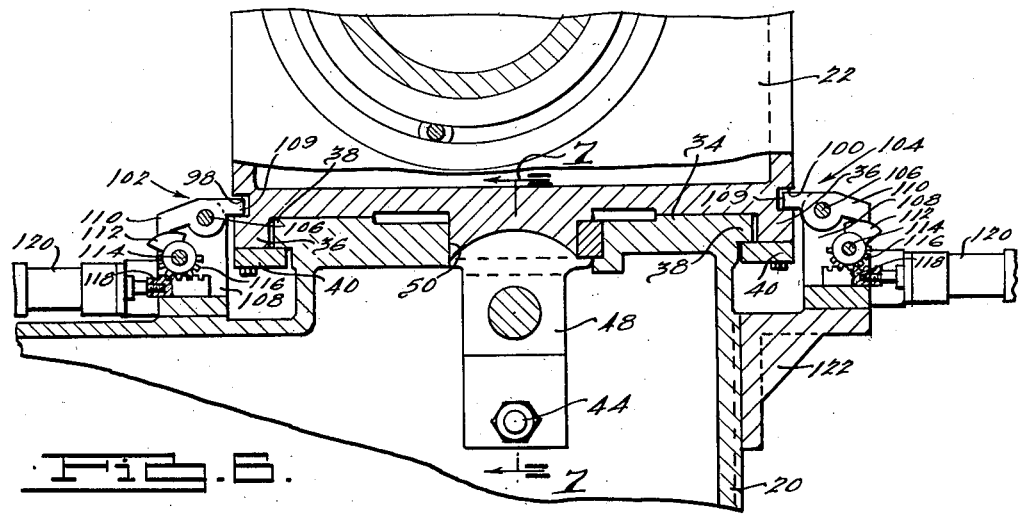
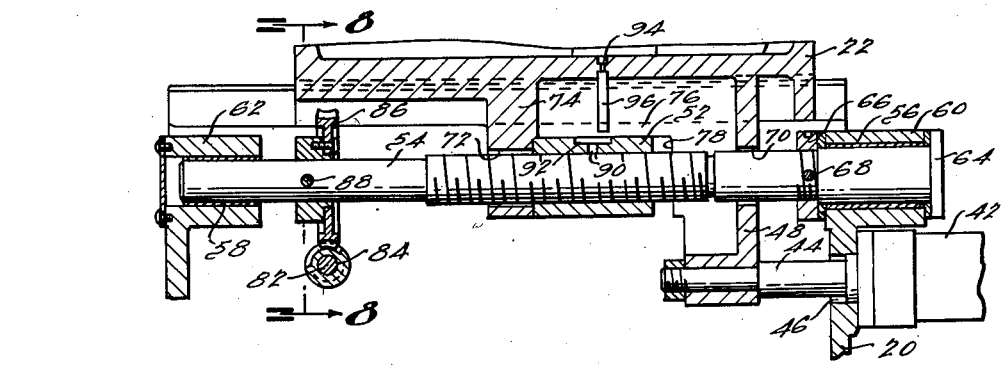
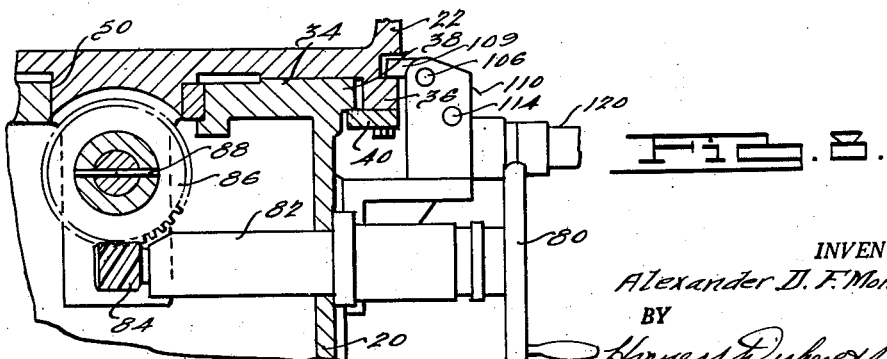

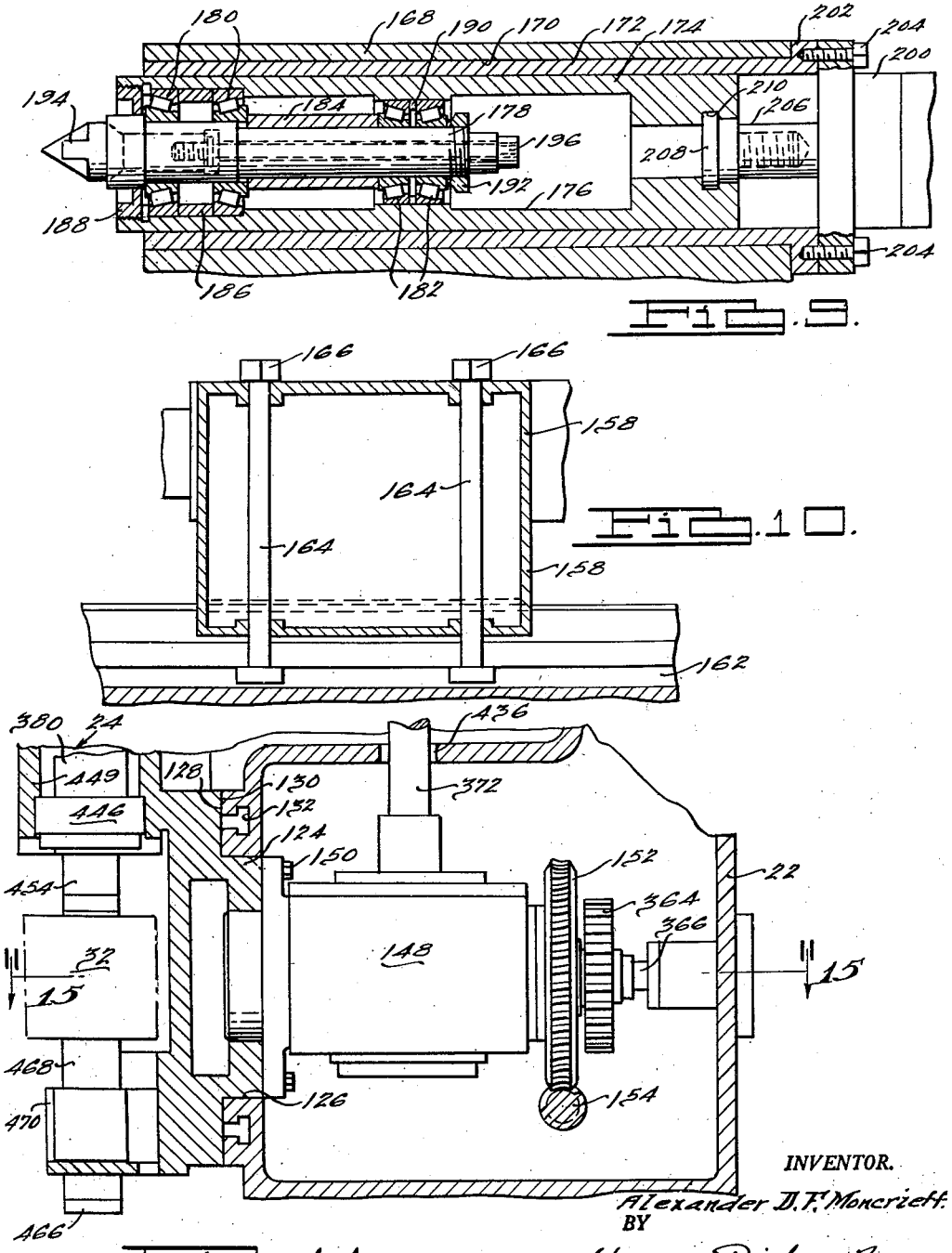

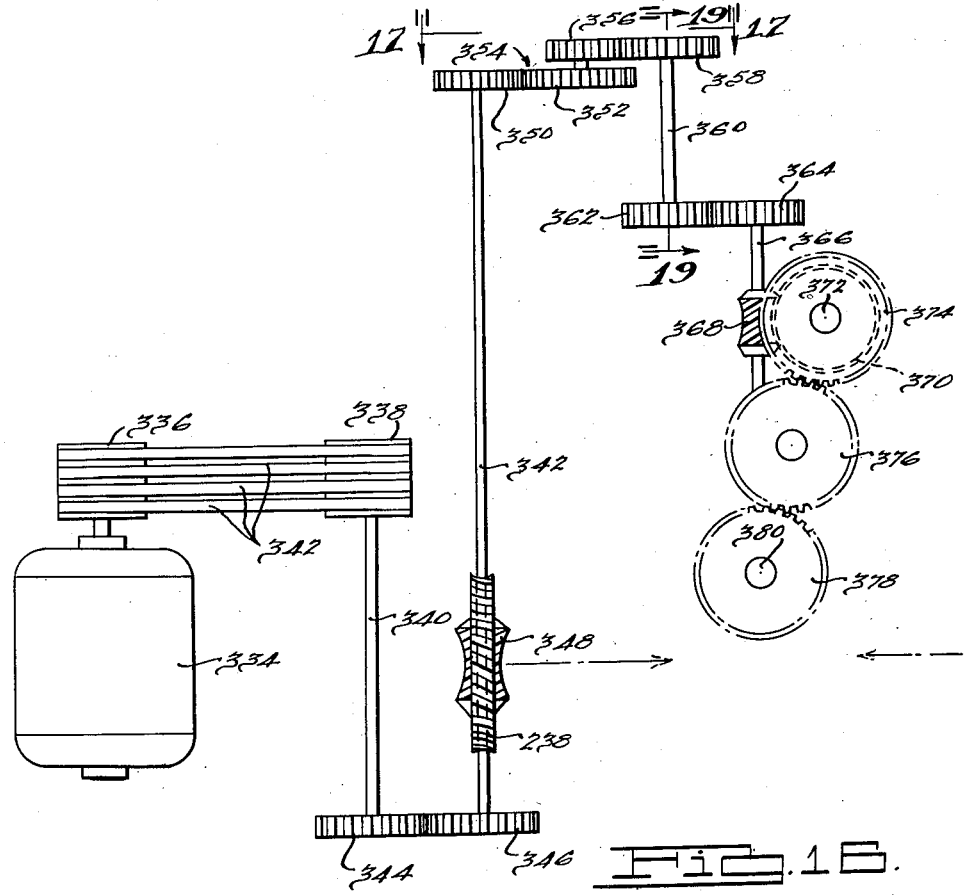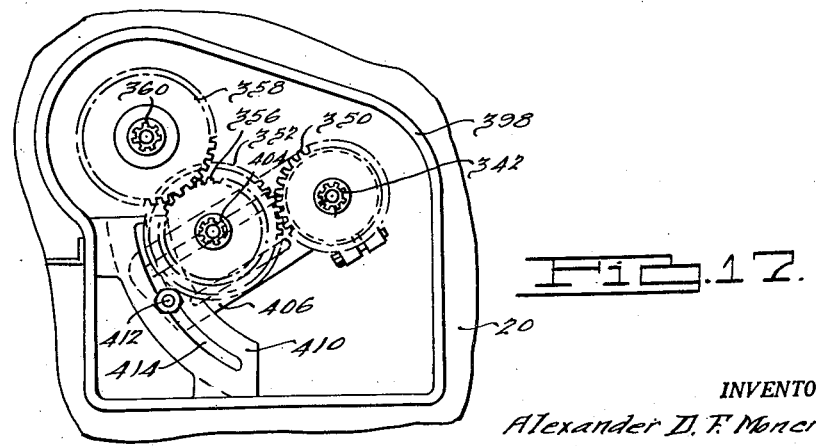

Nov. 6, 1956 A. D. F. MONCRIEFF 2,769,375
HOBBING MACHINE
Filed March 28, 1951 13 Sheets-Sheet 10

INVENTOR.
Alexander D. F. Moncrieff,
BY
Harness, Dickey & Pierce
ATTORNEYS.

Nov. 6, 1956  A. D. F. MONCRIEFF  2,769,375
HOBBING MACHINE
Filed March 28, 1951  13 Sheets-Sheet 11

INVENTOR.
Alexander D. F. Moncrieff
BY
Harness, Dickey & Pierce
ATTORNEYS.

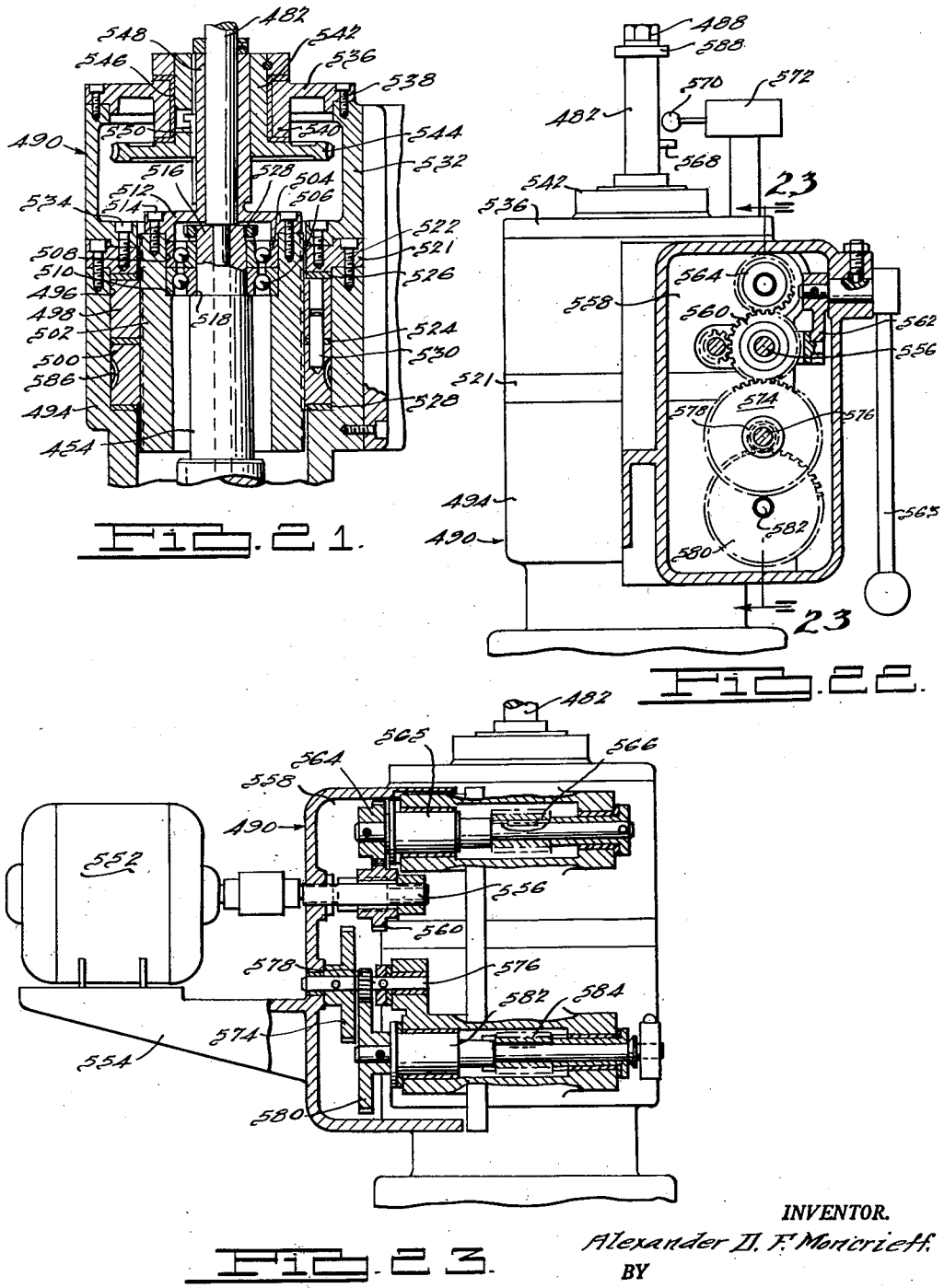

Nov. 6, 1956  A. D. F. MONCRIEFF  2,769,375
HOBBING MACHINE
Filed March 28, 1951  13 Sheets-Sheet 13

INVENTOR.
Alexander D. F. Moncrieff
BY
Harness, Dickey & Pierce
ATTORNEYS.

United States Patent Office 2,769,375
Patented Nov. 6, 1956

2,769,375

HOBBING MACHINE

Alexander D. F. Moncrieff, Detroit, Mich., assignor to Michigan Tool Company, Detroit, Mich., a corporation of Delaware Application March 28, 1951, Serial No. 217,999

4 Claims. (Cl. 90—4)

This invention relates to new and useful improvements in gear-hobbing machines.

An important object of the present invention is to provide a gear-hobbing machine wherein a gear blank is moved across and in mesh with the hob and wherein both the blank and the hob are rotatably driven in timed relation.

Another object of the invention is to provide a gear-hobbing machine wherein the rate at which the gear blank is moved across the hob can be selectively increased or decreased during the hobbing operation without stopping the machine.

Still another object of the invention is to provide a gear-hobbing machine having means for automatically traversing the hob axially with respect to the work during successive hobbing operations so as to utilize the full cutting face of the hob.

Yet another object of the invention is to provide a gear-hobbing machine having novel means for taking up backlash in the mechanism for traversing the hob.

A further object of the invention is to provide a gear-hobbing machine having novel means for adjusting the hob angularly in accordance with the helix angle of the gear being acted upon to assure proper meshed engagement of the hob with the gear blank.

Other objects and advantages of the invention will be apparent during the course of the following description.

In the drawings forming a part of this specification and wherein like numerals are employed to designate like parts throughout the same:

Fig. 4 is an elevational view of the left-hand side of the machine showing the hob carrier vertically disposed;

Fig. 5 is an elevational view of the right-hand side of the machine showing the hob carrier in vertical position;

Fig. 6 is an enlarged, fragmentary, transverse, vertical, sectional view taken on line 6—6 of Fig. 4;

Fig. 7 is a fragmentary, longitudinal, vertical, sectional view taken on the line 7—7 of Fig. 6;

Fig. 8 is a fragmentary, transverse, vertical, sectional view taken on the line 8—8 of Fig. 7;

Fig. 9 is an enlarged, horizontal, sectional view taken on the line 9—9 of Fig. 1 but showing the tailstock retracted;

Fig. 10 is an enlarged, fragmentary, vertical sectional view taken on the line 10—10 of Fig. 2;

Fig. 11 is an enlarged, fragmentary, vertical, sectional view through the hob carrier taken generally on the line 11—11 of Fig. 2 and particularly illustrating the manner in which the hob carrier is adjusted angularly in accordance with the helix angle of the gear blank being acted upon;

Fig. 16 is a diagrammatic view illustrating the common drive for the work and for the hob and also illustrating the manner in which the hob is adjusted angularly in accordance with the lead of the gear teeth without disturbing the rotary drive for the hob;

Fig. 17 is a fragmentary view of the ratio gears which determine the relative rotational speed of the hob and the workpiece and taken generally on the line 17—17 of Fig. 16;

Fig. 21 is an enlarged, fragmentary, vertical, sectional view taken on the line 21—21 of Fig. 5;

Fig. 22 is an enlarged, fragmentary, vertical, sectional view taken on the line 22—22 of Fig. 5;

Fig. 23 is a vertical sectional view taken on the line 23—23 of Fig. 22;

Figure 1:
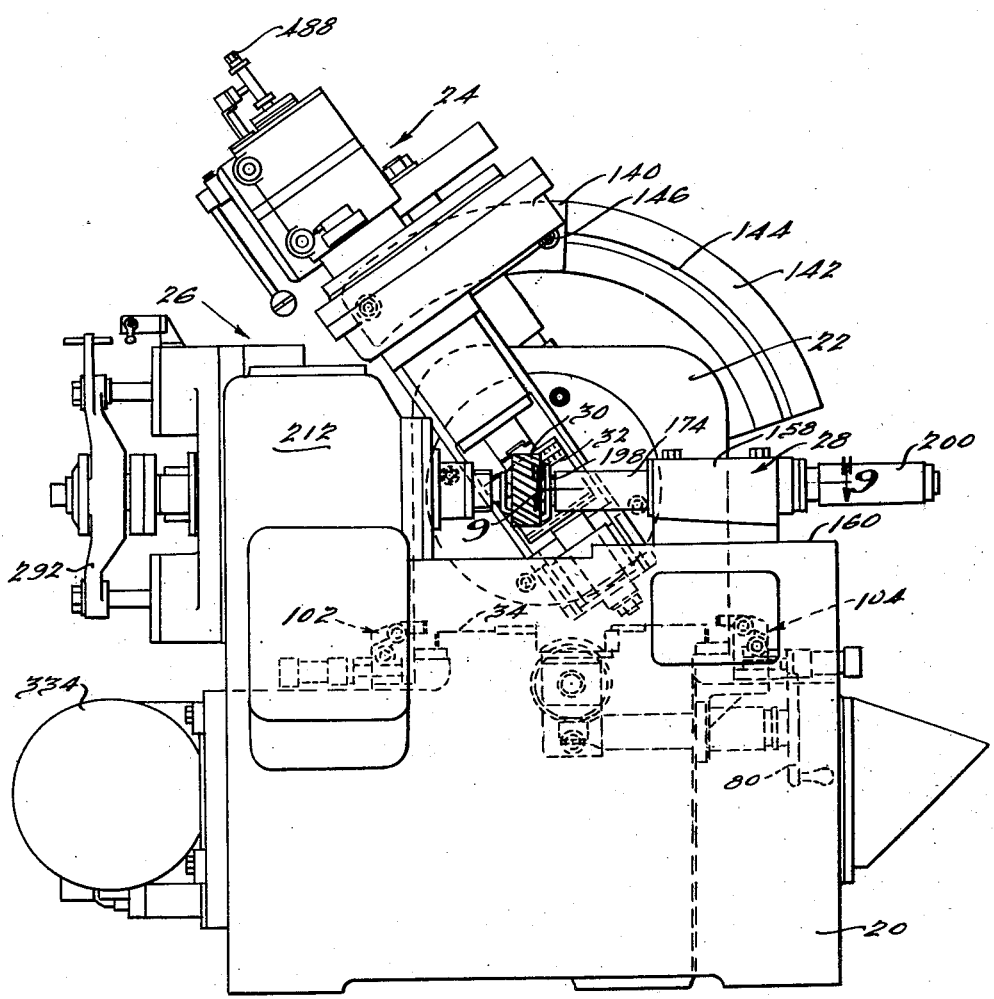
Fig. 1 is a front elevational view of a gear-hobbing machine embodying the invention and showing the hob carrier inclined from the vertical to position the hob for a helical gear blank.

Reference is first had to Figs. 1–5 which illustrate the general construction and operation of the machine. In the general form of the invention shown, the machine is provided with a suitable base 20 having a horizontally movable slide 22 thereon. A hob carrier 24 is mounted on the slide 22 for angular adjustment about a horizontal axis. Also mounted on the base 20 and in front of the slide 22 are head- and tailstocks 26 and 28 which suitably clamp a workpiece 30 and operatively support the same for engagement with a hob 32 on the hob carrier 24.

In operation, the slide 22 is adjustable on the base 20 to move hob 32 to and from the workpiece 30. Prior to a hobbing operation the slide 22 is advanced to position the hob 32 for proper engagement with the gear blank 30. Means is provided for rotating the hob 32 and gear blank 30 in proper timed relation, and it is a feature of the invention that the hob carrier 24 is adjustable angularly in order to position it for proper engagement with the gear blank without disturbing the rotary drive to the hob. In this manner, the machine is readily adaptable for use either with spur gears or helical gears. In Figs. 1 and 3 I show the hob carrier 24 near one limit of its adjustment to position the hub 32 for proper engagement with a helical gear blank, whereas in Figs. 2, 4, and 5 I show the hob carrier positioned vertically and approximately midway between its adjustment limits for operation on a spur gear. In its initial position, the workpiece 30 is disposed at one side of the hob 32, and, in the operation of the machine, means associated with the headstock 26 operates to push the gear blank 30 axially and across the face of the hob 32. After the gear blank 30 disengages the hob 32, slide 22 retracts to move the hob out of the way of the workpiece and the latter is then returned to its initial position preparatory to removal from the machine.

A special feature of the invention resides in the provision of means for feeding the hob axially at an essentially slow rate of speed during successive operations of the machine. In actual practice the hob 32 moves only a very slight distance, for example a thousandth of an inch or so for each operation of the machine. In this manner the full cutting face of the hob 32 is utilized. When the hob 32 reaches the limit of its axial travel it may either be returned to its initial position for re-use or removed from the machine for sharpening.

Another special feature of the invention resides in the provision of means for controlling angular or rotative displacement of the gear blank 30 during axial movement thereof in the hobbing operation. Of course, no rotative displacement occurs in the case of spur gears but helical gears must be rotatively displaced angularly during the hobbing operation to compensate for the lead of the gear teeth. This operation has been accomplished in a novel and efficient manner by incorporating uniquely constructed and coactive guide elements in the headstock 26. The particular arrangement afforded by this invention permits the machine to be readily adapted for either spur gears or helical gears and for helical gears having different leads. Further, the arrangement of the guide elements is such that the rate of advance of the gear blank 30 can be changed at any place in the operation of the machine while the machine is in operation and without stopping the machine. This is highly advantageous in many instances.

With the foregoing as a general introduction to the construction and operation of the machine, attention is now directed particularly to the remaining drawings which illustrate details of construction.

It will be observed (Fig. 6) that the base 20 is generally in the form of a hollow casting uniquely shaped to provide a flat platform 34 at the back and adjacent one side thereof. The platform 34 extends from front to back and the slide 22 is mounted thereon for movement to and from the gear blank 30 in the manner hereinabove described. At opposite sides of the slide 22 are depending flanges 36 which embrace rails 38 projecting laterally from the platform 34. Guide bars 40 bolted to the lower edges of flanges 36 extend inwardly under and loosely receive the rails 38 to hold slide 22 on the base 20 and to guide the slide during its travel back and forth on the platform 34.

Slide 22 is moved back and forth on the base 20 by a fluid motor 42. As shown in Fig. 7, the fluid motor 42 is mounted on the rear wall of the base 20 and the piston rod 44 of the motor extends into the hollow interior of the base through an opening 46. Within the base 20, the rod 44 is connected to a lug 48 which is formed integrally on the slide 22 and extends downwardly into the base through an elongated slot 50 in the platform 34. The fluid motor 42 is operated in any suitable manner and if desired it can be incorporated in a conventional hydraulic circuit which is suitably operated either manually or by conventional automatic controls to advance and retract the slide 22 in the operating cycle of the machine.

Figure 20:
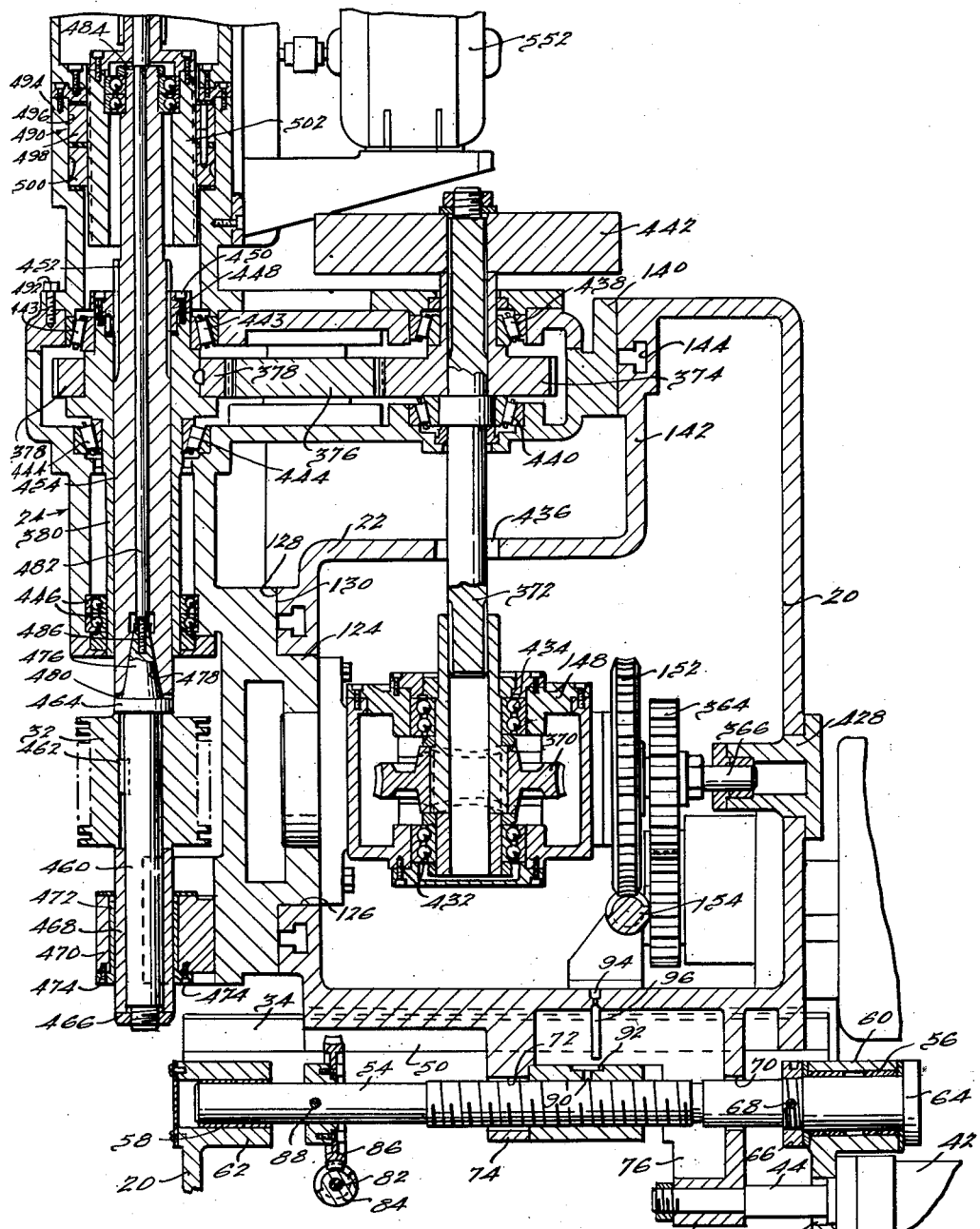
Fig. 20 is an enlarged, vertical, sectional view taken on the line 20—20 of Fig. 2.

Movement of the slide 22 back and forth on the base 20 is limited by a stop nut 52 mounted on a shaft 54 arranged longitudinally of the base 20. As best shown in Figs. 7 and 20, the opposite ends of shaft 54 are supported for rotation in suitable sleeve bearings 56 and 58 mounted in embossments 60 and 62 respectively formed integrally on the rear and front walls of the base 20. The rearward end of shaft 54 is formed with an enlarged head 64 which abuts and is held solidly against the embossment 60 by a nut 66 threaded on the shaft inside the base. A set screw 68 carried by the nut 66 prevents the latter from loosening on shaft 54. Shaft 54 extends through an opening 70 in the lug 48 and also through an opening 72 in a second lug 74 which depends from the slide 22 forwardly of lug 48. The stop nut 52 is located between the two lugs 48 and 74 and is formed with a flat top surface which seats upwardly against and is held against rotation by the lower edges of flanges 76 which extend between and interconnect the lugs 48 and 74.

In the drawings the slide 22 is shown fully retracted with the lug 74 against the forward end of stop nut 52, and, in operation, the slide is advanced by fluid motor 42 until the lug 48 engages the stop nut. It will be observed in this connection that the travel of slide 22 is relatively short, but the travel shown is adequate under the circumstances as it is necessary merely to retract the hob 32 sufficiently to disengage the gear blank 30 when the latter is returned by the head and tailstock mechanisms to the initial position.

Some adjustment of the stop nut 52 back and forth on shaft 54 is necessary to position the hob 32 properly for engagement with gear blanks of different diameters and to adapt the machine for different size hobs. It will be apparent, however, that the distance traveled by the slide 22 on the base 20 will be the same regardless of the adjusted position of the nut 52.

According to the present invention, adjustment of the stop nut 52 is accomplished manually by a handwheel 80 having an operating shaft 82 journaled in one side wall of the base 20 and carrying a worm 84 on the end thereof which engages a worm wheel 86 on and fixed to the shaft 54 by a cross pin 88. Thus the shaft 54 can be rotated in either clockwise or counterclockwise direction by the handwheel 80. As the nut 52 is held against rotation, it is either advanced or retracted on the shaft 54, depending upon the direction of rotation of the latter.

The internal threads of stop nut 52 and the external threads of shaft 54 are lubricated through an oil hole 90 which opens into an elongated slot 92 in the top surface of the nut. Lubricant introduced through a hole 94 in the base of slide 22 is carried downwardly by a tube 96 which discharges it to the groove 92. Manifestly, the groove 92 should be sufficiently long to register with the tube 96 in all adujsted positions of the stop nut 52.

It is desirable that the slide 22 be clamped solidly against the base 20 during the hobbing operation in order to prevent any possibility of change in the relative positions of the hob 32 and the gear blank 30. To this end the slide 22 is provided at opposite sides and adjacent the bottom thereof with longitudinal grooves 98 and 100 which receive clamps 102 and 104 respectively (Fig. 6). Clamp 102 is mounted to rock about a horizontal pivot 106 carried by a generally U-shaped support 108 disposed on the base 20 beside slide 22. At the inner side thereof the clamp 102 is formed with a clamping arm 109 which extends into the confronting groove 98. At the outer side of the clamp 102 is an arm 110 which seats downwardly against a segmental cam 112 mounted to oscillate about a pivot 113 also carried by the U-shaped bracket 108. The surface of cam 112 which supports the arm 110 is disposed eccentrically to the pivot 114 and the arrangement is such that the cam 112 presses the arm 109 downwardly against the slide 22 when the cam is rotated in a clockwise direction as viewed in Fig. 6. Rotation of the cam 112 is effected by a segmental gear 116 formed integrally therewith and in mesh with a rack 118 which is supported on the base of the bracket 108 and is reciprocated axially by a fluid motor 120.

The clamping mechanism identified by numeral 104 is identical in its essential details to the clamping mechanism 102, the only difference being that clamping mechanism 104 is mounted on a special bracket 122 which is secured to the side of the base 20. In view of the substantial identity of the two clamping mechanisms 102 and 104, corresponding members thereof are designated by the same reference numerals.

The two fluid motors 120 are connected in a suitable hydraulic circuit and operated simultaneously to clamp or release the slide 22, and conventional means conveniently can be employed to operate the fluid motors 120. A detailed description of the hydraulic equipment is therefore not necessary. It should perhaps be stated at this point, however, that the fluid motors 120 are operated to clamp the slide 22 after the latter has been advanced by fluid motor 42 to bring the hob 32 into operative relation with the gear blank 30 and that they are operated to release the slide after the hobbing operation is completed.

Figure 15:
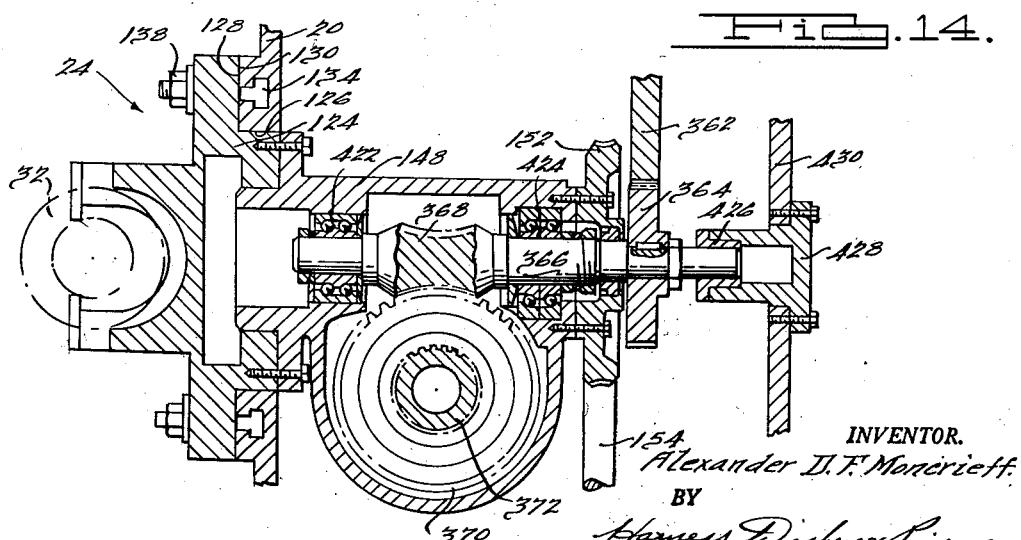
Fig. 15 is a horizontal sectional view taken on the line 15—15 of Fig. 11.

Reference is now had to Figs. 1, 5, 11, and 15 which perhaps best illustrate the adjustable mounting of the hob carrier 24 on the slide 22. Hob carrier 24 is formed at the lower end thereof with a rearwardly extending circular embossment 124 which is journaled for rotation in an opening 126 in the front wall of slide 22. Also, the front wall of the slide 22 is provided around the opening 126 with a flat annular bearing surface 128 which seats and supports a radial bearing surface 130 on the hob carrier 24. An annular T slot 132 is provided in the slide 22 around and concentric to the opening 126 and a plurality of circumferentially spaced T bolts 134 are mounted on this hob carrier 24 to operate in the slot. Nuts 138 are provided on the projecting ends of the T bolts (Fig. 15). When nuts 138 are loose on the T bolts 134 the latter turn freely in the T slot 132 to permit angular adjustment of the hob carrier 24, and, when the hob carrier has been moved to the selected angularly adjusted position, nuts 138 are tightened to hold the carrier in that position.

As perhaps best shown in Fig. 5, the upper portion of the hob carrier housing extends laterally over the slide 22 and the laterally extending portion of the housing has a flange 140 which seats laterally against an upstanding wall 142 on the slide 22. A T slot 144 is formed in the front face of wall 142 concentrically to the axis about which the hob carrier turns, and the T slot 144 carries T bolts (not shown) which extend forwardly through the flange 140 and carry nuts 146. This latter construction supports the relatively heavy upper portion of the hob carrier 24. Manifestly, the nuts 146 must be loosened in addition to nuts 138 to permit angular adjustment of the hob carrier 24 and they are similarly tightened after adjustment of the carrier to hold the latter in the selected adjusted position.

In view of the extreme weight of the hob carrier 24 it is desirable to provide some mechanism for angularly adjusting the same. According to the present invention this is accomplished in a novel and efficient manner by combining the adjusting mechanism with the rotary-drive mechanism for the hob in such a way that the two mechanisms serve a double function in the combination. More particularly, a gear housing 148 is fastened to the embossment 124 by bolts 150 inside the slide 22 which is in the form of a hollow casting, and a worm gear 152 is fastened securely to the inner end of the housing. A worm 154 extending transversely through and rotatably supported by the slide 22 meshes with the worm wheel 152. One end of the shaft which carries worm 154 extends exteriorly of the slide 22 and the projecting portion thereof has a square terminal 156 which is adapted to receive a wrench or other suitable tool. When nuts 138 and 146 are loosened the hob carrier can be adjusted angularly by a suitable tool applied to the end 156, and in making the adjustment the mechanical advantage afforded by the worm and worm gear 154 and 152 respectively of course is utilized.

Figure 2:
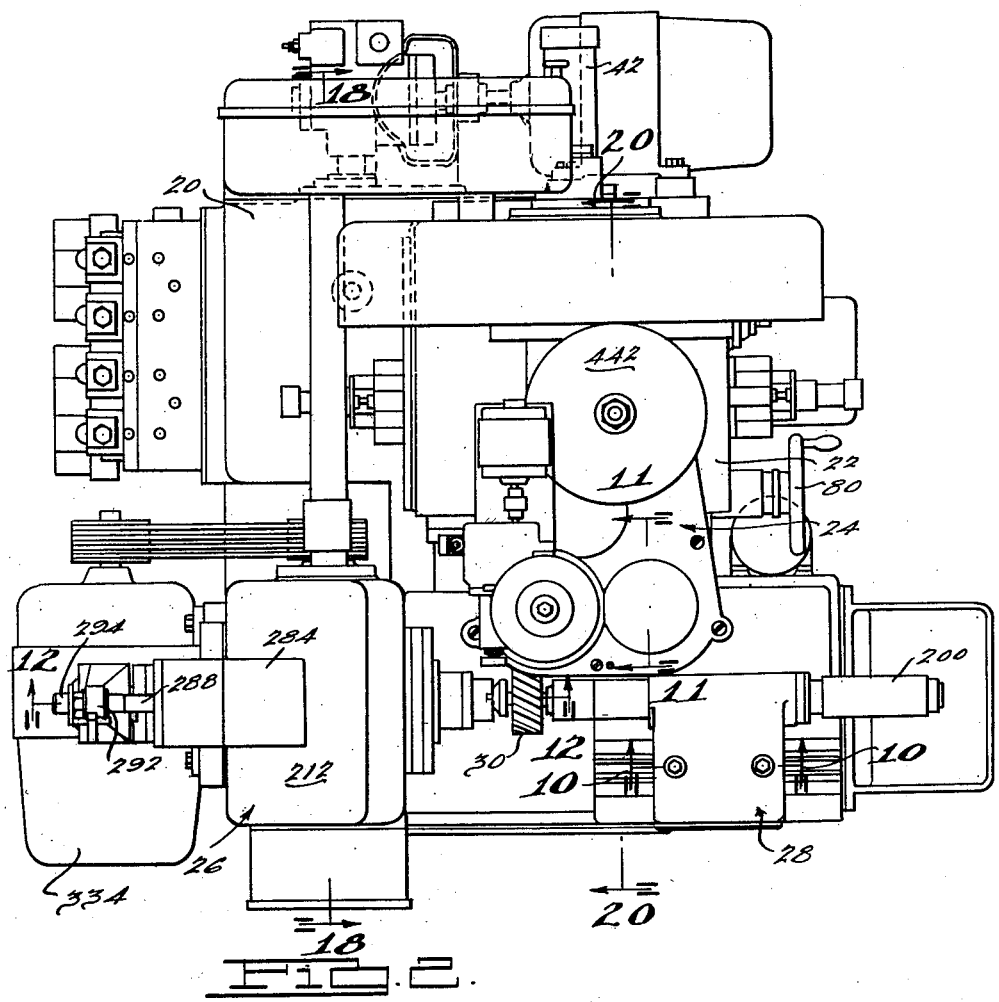
Fig. 2 is a top plan view of the machine but showing the hob carrier disposed vertically to position the hob for a spur gear blank.
Figure 3:
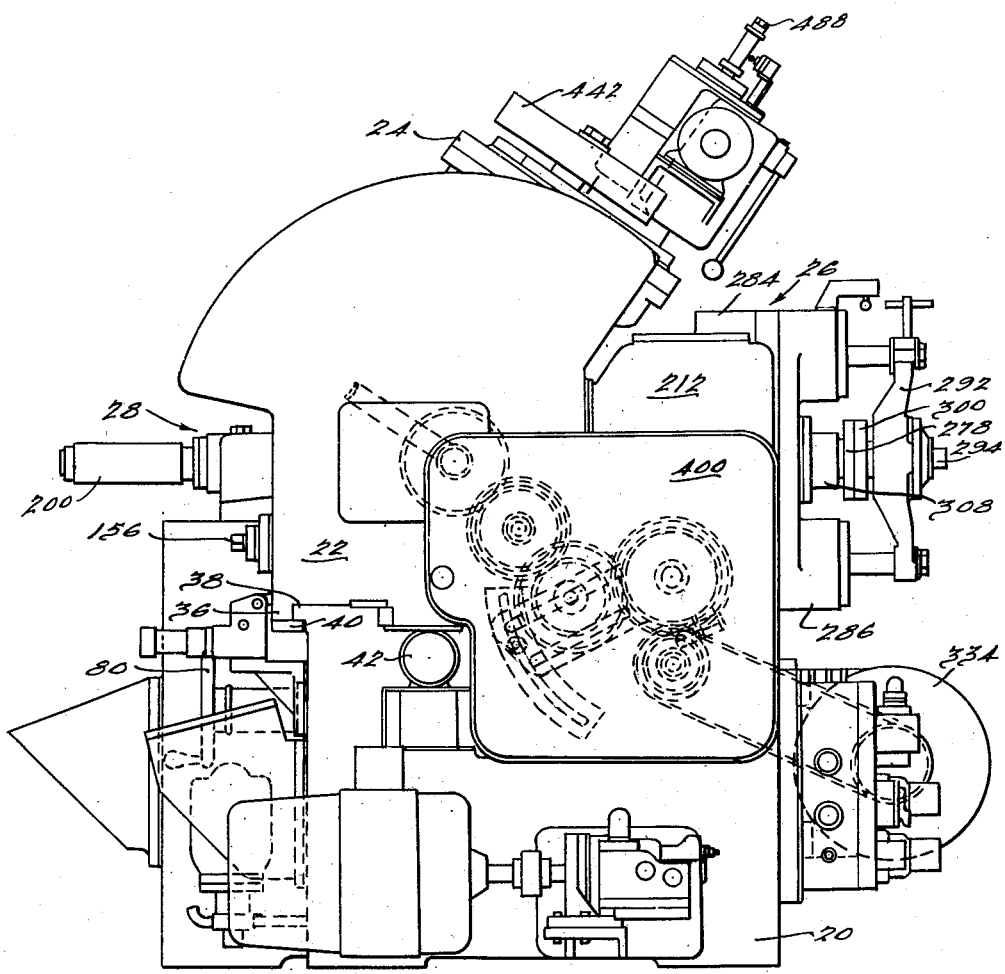
Fig. 3 is a rear elevational view of the machine showing the hob carrier inclined from the vertical.

As suggested, the hob carrier 24 is positioned on the slide 22 as shown in Figs. 2, 4, and 5 when the workpiece 30 is in the form of a spur gear, and is adjusted angularly from this position when the workpiece is a helical gear. Manifestly, the extent to which the hob carrier 24 is displaced angularly depends in every instance upon the lead of the teeth on the particular gear blank being acted upon. The hob carrier 24 is moved to one side when the teeth of the workpiece have a right-hand lead and to the other side when the teeth of the workpiece have a left-hand lead. Thus, the machine is adjustable not only for various sizes of workpieces but also for workpieces having teeth of different leads and for either a left-hand or a right-hand lead.

Attention is now directed to Figs. 1, 9, and 10 which best show the tailstock 28 that supports one side of the gear blank 30. In Fig. 1 the tailstock 28 is shown advanced to clamp the gear blank 30 and the latter is shown in operative engagement with hob 32. In Fig. 9 the tailstock is shown retracted and disengaged from the gear blank 30.

In any event the tailstock 28 comprises a hollow cast metal housing 158 which is adjustable on a flat bearing surface 160 on the base 20. A T slot 162 disposed medianly in the bearing surface 160 extends parallel to the axis of the gear blank 30, and T bolts 164 in the slot extend upwardly through the housing 158. Nuts 166 on the upper ends of the T bolts 164 are tightened to hold the housing in a selected adjusted position. As will be apparent hereinafter, the T bolts 164 merely provide an approximate adjustment for the tailstock so that the latter can be properly positioned for different sized workpieces and particularly for workpieces of different length. In operation of the machine it is not necessary to adjust the tailstock housing 158 on the base 20 except when setting up for a workpiece which differs substantially in length from the workpiece or workpieces previously used in the machine.

Formed on and at the inner side of the housing 156 is a laterally projecting portion 168 having a horizontal bore 170 which receives a tubular liner 172. A piston 174 is mounted for reciprocation in the liner 172. At least a forward portion of the piston 174 is hollow as at 176 and the tailstock spindle 178 disposed therein is supported for rotation by two front bearings 180 and two rear bearings 182 separated by a spacer 184. The two front bearings 180 are here shown separated by a ring 186 and the bearings are held in the piston 174 by a nut 188 threaded in the forward end of the piston around the spindle 178. The two rear bearings 182 are shown separated by a ring 190, and these bearings are held in place by a nut 192 threaded on the rearward end of spindle 178. The spindle 178 is here shown provided with a conventional center 194 held solidly in place by an elongated bolt 196 according to conventional practice. The center 194 is adapted to receive the usual work-clamping dog 198, as shown in Fig. 1.

Piston 174 is moved back and forth in the liner 172 by a fluid motor 200. The motor is fastened to a radial flange 202 on the rearward end of liner 172 by bolts 204 and has a piston rod 206 which is connected to the piston 174 by a T bolt 208. The T bolt 208 is received in a T slot 210 which extends transversely entirely through the piston 174. By reason of this construction the fluid motor 200 can be readily dismounted for servicing by unscrewing bolts 204, pulling the piston 174 at least part way through the open rearward end of the liner 172 and then disengaging the T bolt 208 from the T slot 210.

From the foregoing it will be readily apparent that both the center 194 and the clamping dog 198 carried thereby are movable axially to clamp or disengage the gear blank 30 by fluid motor 200. The spindle 178 which carries center 194 moves axially with the piston 174, and the piston is actuated by fluid motor 200. At the same time, the spindle 178 is freely rotatable with the gear blank 30 independently of the piston 174.

Attention is now directed particularly to Figs. 1 and 12–14 which show the construction and arrangement of the headstock 26. It will be observed in this connection (Fig. 1) that the operating parts of the headstock 26 are contained primarily in a housing 212 disposed on the base 20 opposite the tailstock 28.

Figure 12:
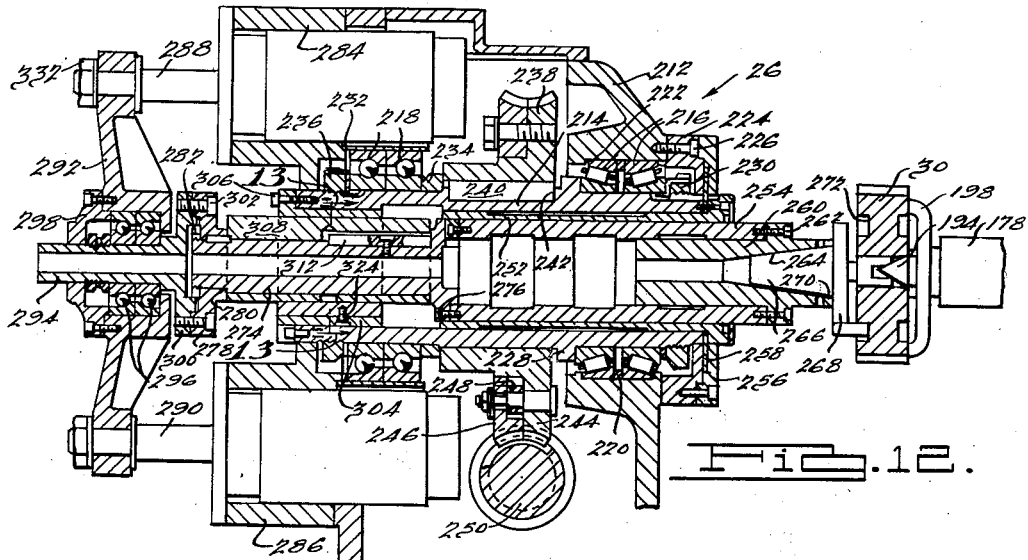
Fig. 12 is an enlarged, fragmentary, vertical, sectional view through the headstock and associated mechanism which rotatably drives and axially moves the work, the view being taken generally on the line 12—12 of Fig. 2.

As specifically shown in Fig. 12, the headstock 26 comprises a tubular shaft 214 which is supported for rotation in the housing 212 by front bearings 216 and rear bearings 218. Two front roller bearings 216 separated by a spacer 220 are here shown, and the bearings are held against an internal radial shoulder 222 of the housing 212 by a collar 224 which is detachably fastened to the front of the housing by an annular series of screws 226. The shaft 214 is formed with a radial flange 228 which is held against the inner bearing 216 by a nut 230 threaded on the forward end of the shaft. Also, the instant construction embodies two ball bearings 218 received within a bearing carrier 232 and held against the spacer 234 by a nut 236 threaded on the rearward end of shaft 214.

A rotatable drive is provided for shaft 214 by a worm gear 238 which surrounds and is rotatably fixed to the shaft by a key 240. Gear 238 is held against axial movement on shaft 214 by a spacer 234 and a radial shoulder 242 both on the shaft. The particular gear 238 here shown is a split gear of conventional construction having separate toothed sections 244 and 246 that are relatively displaceable circumferentially by a cam 248 to take up backlash between the worm gear and a worm 250 which meshes with and rotatably drives the worm gear. Manifestly, rotation of gear 238 rotatably drives the shaft 214 through key 240.

Within the tubular shaft 214 is a sleeve bearing 252 which slidably supports the headstock spindle 254. A face plate 256 bolted to the collar 224 confines a slinger ring 258 to prevent loss of oil normally maintained in the housing 212 to lubricate the bearings and moving parts contained therein. The spindle 254 here shown is tubular in form, and a plug 260 is fastened in the forward end of the spindle by screws 262. The plug 260 has a tapered hole 264 which receives the correspondingly tapered shank 266 of a conventional driving dog 268. A rotary drive is established between the plug 260 and the dog 268 by inner engaging teeth 270 thereon, and the dog extends into an opening 272 in the side of the gear blank 30 to establish and maintain a rotary drive between the dog and the gear blank.

The spindle 254 has a rearward extension 274 which is detachably fastened thereto by screws 276, and a collar 278 is keyed to the rearward end of the extension and held against a radial shoulder 280 on the extension by a threaded nut 282. Spindle 254 is reciprocated back and forth in the rotary drive shaft 214 by a pair of fluid motors 284 and 286 disposed on opposite sides thereof and suitably supported by the housing 212. The two piston rods 288 and 290 of the fluid motors 284 and 286 respectively are connected to opposite ends of a cross link 292, and the latter carries a relatively short shaft 294 which is rotatably supported by bearing 296 confined by a bearing retainer 298. At the inner end of shaft 294 is a radial flange 300 which aligns with the collar 278 on the spindle extension 274 and is detachably fastened thereto by screws 302. By reason of this construction the fluid motors 284 and 286 act through the cross link 292 and connecting parts to move the spindle 254 axially back and forth during operation of the machine so as to move the gear blank 30 across the hob 32 to the end of its forward stroke and then to retract the gear blank to its initial position after the hobbing operation has been completed. Also, it will be apparent that the spindle 254, spindle extension 274, and shaft 294 are free to rotate independently of the reciprocatory actuating mechanism.

According to the present invention rotation is transmitted from the driving shaft 214 to the spindle 254 through a novel guide mechanism which also serves to effect angular or rotative displacement of the spindle and consequently of the gear blank 30 during reciprocal travel thereof. When the workpiece 30 is a spur gear, the guide holds the spindle to a rectilinear path of travel, whereas if the workpiece is a helical gear, the guides cause the spindle 254 and workpiece to cork-screw or be angularly or rotatively displaced in accordance with the lead of the gear teeth. The guides of course are adapted for the particular gear being acted upon and it is necessary to replace the guides whenever the machine is adapted for a different type gear. It is a feature of the invention that the guides are readily accessible and easily replaceable.

Figures 13, 14:
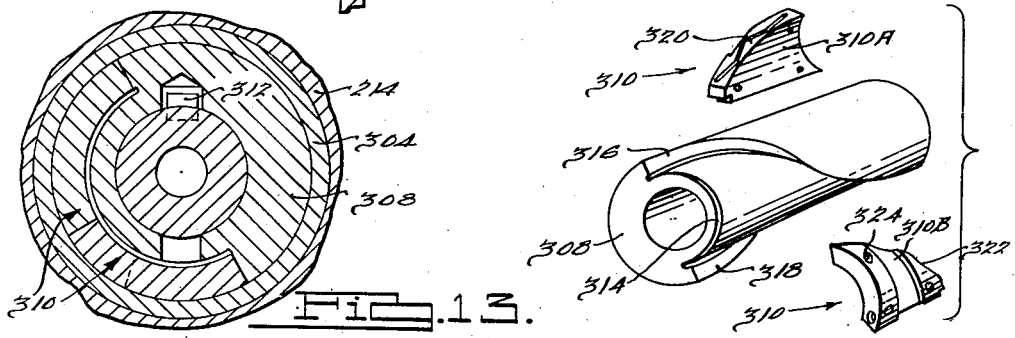
Fig. 13 is an enlarged, fragmentary, vertical, sectional view taken on the line 13—13 of Fig. 12.
Fig. 14 is an exploded perspective view showing the stationary and movable guide elements which control angular or rotary displacement of the gear workpiece during reciprocation thereof in accordance with the lead of the gear teeth.

More specifically, the above mechanism comprises a guide bushing 304 which fits snugly within the rearward end of shaft 214 and is detachably fastened thereto by screws 306. Within the bushing 304 is an axially fixed guide member 308 and an axially movable guide member 310. The axially fixed guide member 308 is generally tubular in form, fits snugly around the spindle extension 274, and is connected thereto by a key 312 for mutual rotation therewith. Approximately half the guide member 308 is cut away at the outer surface thereof to provide a portion 314 of reduced thickness and to define radial guide walls or cams 316 and 318 (Fig. 14). The relatively movable guide member 310 fits in the cutout portion of the companion guide member 308 and snugly between the radial guide surface 316 and 318. As shown in the drawings, the guide member 310 is relatively thin so as to lie flush with the outer surface of the guide 308 when the parts are assembled together. Thus, when the two guide members 308 and 310 are assembled, they, in effect, form a complete cylinder, although the guide member 310 possibly is considerably shorter than the relatively fixed guide member 308. The guide member 310 here shown is made in two parts, 310A and 310B, having diagonal mating edge surfaces 320 and 322 so that the parts can be moved axially relative to each other to adjust the width of the member so that it fits snugly in the cutout portion of guide member 308 and flatly engages both of the radial guide surfaces 316 and 318. Since the guide surfaces 316 and 318 control angular or rotative displacement of the spindle during axial movement thereof, it is desirable to eliminate any play or relatively rotational movement between the two guide elements 308 and 310. This is accomplished in a highly efficient manner by making the guide member 310 in two parts as shown. Both parts of guide member 310 are fastened to the guide bushing 304 by screws 324 which extend inwardly from the bushing and into the guide parts. The holes in the bushing 304 which receive screws 324 are made sufficiently oversize to permit the slight relative movement that is required between the two guide parts 310A and 310B to assure a snug fit between guide surfaces 316 and 318 and for any adjustment that is required from time to time to compensate for wear taking place between the two guide members 308 and 310.

From the foregoing it will be apparent that the bushing 304 is fastened to the rotary drive shaft 214 and that the guide element 310 is fastened to the guide bushing so that all of these parts operate in unison. The guide member 310 in turn acts through radial faces 316 and 318 to rotatably drive guide member 308 and the latter acts through the key 312 to rotatably drive spindle 254. At the same time that the spindle 254 is being rotatably driven, fluid motors 284 and 286 are free to move it axially. During such movement the guide bushing 304 and guide member 310 remain axially fixed while the companion guide bushing 308 moves axially with the spindle. Since relative axial motion occurs between the guide members 308 and 310 it is apparent that radial cam faces 316 and 318 guide the spindle 254 in its axial travel. As suggested, these cam faces 316 and 318 are straight or rectilinear when the workpiece 30 is a spur gear and they extend in a helical path when the workpiece is a helical gear. The latter form of guide is shown in the drawings and perhaps is best illustrated in Fig. 14. In practice the helix angle of the guide is a function of the lead of the gear blank. It will be apparent, however, that the helix angle of the guide will not be the same as the helix angle of the gear except when both the guide and the gear are the same diameter. Actually the helix angle of the guide is greater than the helix angle of the gear whenever the gear is smaller in diameter than the guide. Conversely, the helix angle of the guide will be less than the helix angle of the gear whenever the gear is larger in diameter than the guide.

In order to facilitate removal of the guide members 308 and 310 the upper end of cross link 92 is made in the form of a hook as perhaps best shown at 330 in Fig. 4. Thus, when nut 332 and the screws 302 are removed, the link 292, together with the stub shaft 294 carried thereby, can be swung to the broken-line position in Fig. 4. Nut 282 can then be removed and collar 278 pulled off of the shaft extension 274. This operation exposes the guide members 308 and 310 which usually are disassembled, together with the guide bushing 304, merely by removing screws 306. The entire guide assembly can then be pulled out of the drive shaft 214 and necessary repairs or substitutions made. Manifestly, the parts are reassembled in converse order.

The common drive which assures operation of the work 30 and hob 32 in proper timed relation is now described. Attention is first directed particularly to Fig. 16 which shows the drive diagrammatically.

Power is derived from a motor 334 mounted on the side of the base 20. The drive shaft of the motor carries a multi-groove pulley 336 which is connected to a similar pulley 338 on a driven shaft 340 by endless belts 342. Shaft 340 is rotatably connected to a second shaft 342 by speed gears 344 and 346. Shaft 342 carries a worm 348 which meshes with the worm gear 238 in the headstock 26 of the machine. Shaft 342 also carries a gear 350 which meshes with the gear element 352 of a double gear 354. The other gear element 356 of double gear 354 meshes with a gear 358 on a shaft 360. All of gears 354 and 358 constitute ratio gears and accordingly are readily removable so that the ratios of the gears can be selected according to the exigencies of the particular situation. Shaft 360 carries a second gear 362 which meshes with a gear 364 on a shaft 366. The latter shaft carries a worm 368 which meshes with a worm gear 370. The latter is fixed on the lower end of a vertical shaft 372 and on the upper end of this shaft is a gear 374 which meshes with an intermediate idler gear 376. The idler gear 376 meshes with a gear 378 on the upper end of the hob spindle here designated generally by the numeral 380.

From the above it will be readily apparent that the drive shaft 214 which drives the gear blank 30 will be driven in timed relation with the shaft 380 which drives the hob 32. The speed at which the work 30 and hob 32 are driven can be selectively controlled within limits by varying the ratio gears 344 and 346. In practice, these gears preferably are accessible from outside the machine and are easily replaceable so that gears of different ratios can be mounted on the shafts 340 and 342.

The relative speeds at which the work 30 and the hob 32 are driven can be selectively controlled by judiciously selecting proper ratio gears 350, 354, and 358.

For a more detailed description of the drive, reference is had to the several views specifically referred to below.

Figures 18, 19:
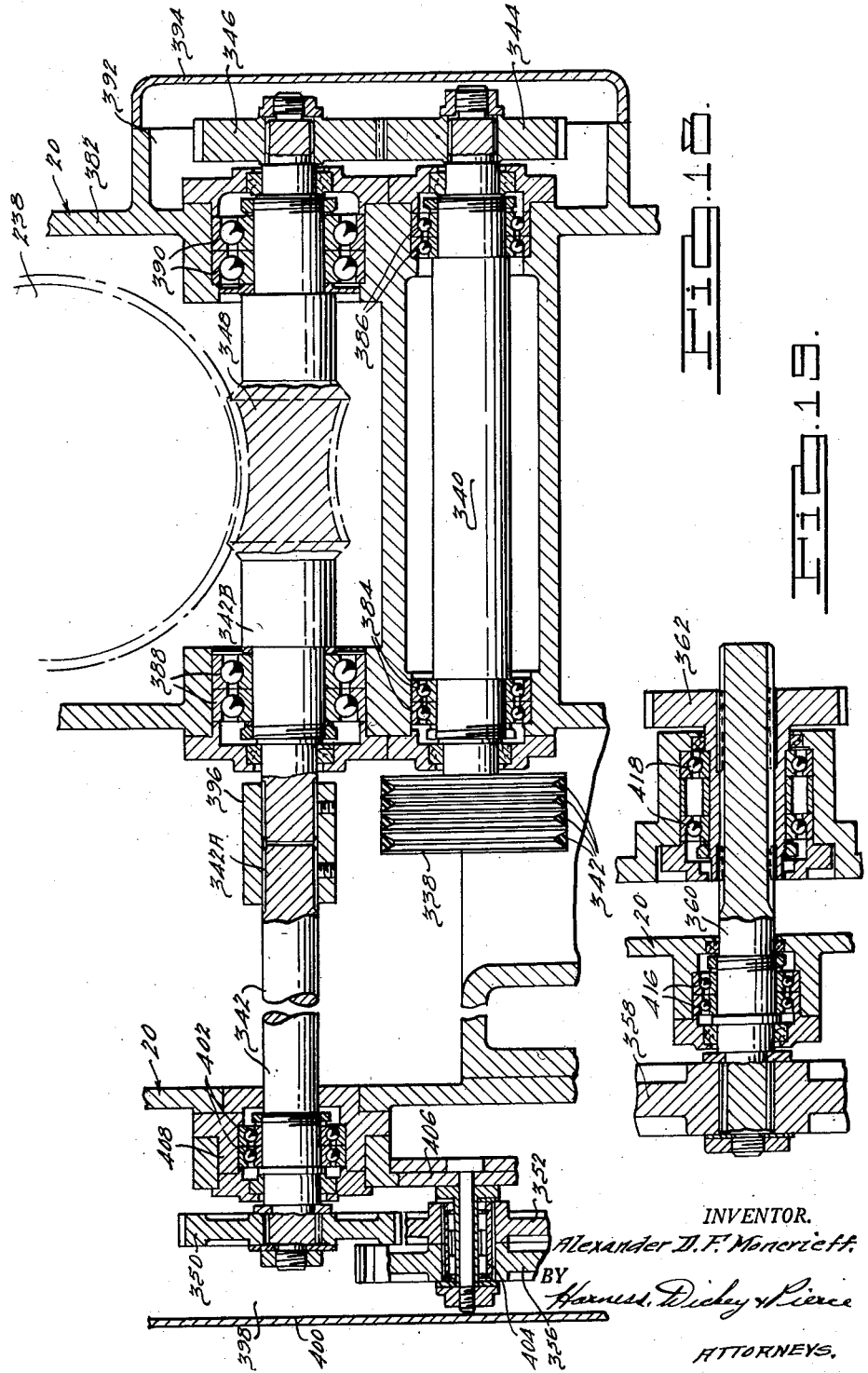
Fig. 18 is an enlarged, fragmentary, vertical, sectional view taken on the line 18—18 of Fig. 2.
Fig. 19 is a sectional view taken on the line 19—19 of Fig. 16 and illustrating the manner in which the shaft and gears shown in the drawings are supported for rotation.

Fig. 18 illustrates the first portion of the drive and illustrates how the shaft 340 and a portion of the shaft 342 are journaled within and suitably supported by a boxlike extension 382 on the housing 20. Specifically, shaft 340 is supported at opposite ends thereof by bearings 384 and 386 mounted in suitable openings provided in opposite sides of the base extension 382. Shaft 342 is similarly supported by bearings 388 and 390 mounted in opposite walls of the housing extension 382 and the speed gears 344 and 346 which rotatably interconnect the two shafts 340 and 342 are disposed within a compartment 392 on the outside of the housing extension. The compartment 392 normally is closed by a removable cover 394.

The shaft 342 preferably is formed in two sections here designated 342A and 342B for convenience in making the section having the worm 348, and the two sections of the shaft are connected for mutual rotation by a suitable coupling 396. Shaft 342 extends into a gear housing 398 (Fig. 17) on the opposite side of the main housing 20, which gear housing 398 contains the ratio gears hereinabove described. The ratio gear housing 398 normally is closed by a removable cover 400. At the point where shaft 342 enters the gear housing 398 it is suitably supported for rotation by bearings 402.

It is contemplated that any suitable or conventional ratio gear arrangement be used for this invention; however, in the particular construction here shown, the intermediate double gear 354 is mounted on a journal 404 carried by an arm 406 pivoted on the bearing housing 408 which carries the two bearings 402 (Figs. 17 and 18). The double gear 354 is readily removable from the journal 404 so that the gears are readily replaceable, and it is adjustable longitudinally along arm 406 to assure proper meshed engagement between different size gears and the co-operating gears 350 and 358. Also, in order to adapt the unit to gears of different size the distal end of pivoted arm 406 is fastened to a fixed bracket 410 by bolt and nut 412 operable in an arcuate slot 414. This general arrangement is old and well known and further description therefore is deemed unnecessary.

As shown in Fig. 19, the shaft 360 is rotatably supported by bearings 416 and also by bearings 418 to position gear 362 for proper engagement with gear 364.

Fig. 15 illustrates particularly the manner in which the shaft 366 is journaled in gear housing 148. As shown, the shaft 366 is supported on opposite sides of the worm 368 by bearings 422 and 424 disposed at or adjacent opposite sides of the gear housing. In addition, the end of shaft 366 which extends from gear housing 148 is supported by a suitable bearing 426 supported by a suitable bearing carrier 428 mounted in a wall of the housing 20. Step-over gear 364 is keyed to shaft 366 exteriorly of the gear housing 148 and it rotatably drives the shaft as well as the worm 368 formed thereon. The worm 368 of course drives worm gear 370 in the manner hereinabove described.

Reference is now had to Fig. 20 which shows in detail the mounting and arrangement of the parts which transmit the rotary drive from worm gear 370 to the hob 32. The vertical shaft 372 is mounted in the gear housing 148 laterally of horizontal shaft 366, and the lower end thereof is rotatably supported at opposite sides of worm gear 370 by bearings 432 and 434. The shaft 372 extends exteriorly of the housing through an elongated slot 436 which permits the shaft to swing with the hob carrier 24 within the limits of its angular adjustment on the housing 20. As shown in the drawings, the projecting end of the shaft 372 extends into and through the upper overhanging portion of the hob carrier 24 and is suitably rotatably supported in the upper and lower walls of the carrier by bearings 438 and 440. A flywheel 442 is rotatably fixed on the projecting upward terminal portion of shaft 372 for an obvious effect. Gear 374 is keyed to shaft 372 between bearings 438 and 440. The intermediate idler gear 376 is suitably journaled in the hob carrier housing 24 as shown in Fig. 20 and this gear transmits rotation from gear 374 to gear 378 in the manner hereinabove described. The latter gear is suitably keyed to a tubular quill shaft 380 which is mounted for rotation in the vertical portion of the hob carrier housing 24 by bearings 443, 444, and 446. A splined collar 448 fastened to the upper end of quill 380 by screws 450 engages external splines 452 on the hob spindle 454 to transmit rotation from the quill to the spindle.

The mounting and manner of transmitting rotation from the spindle 454 to the hob 32 is now described. In this connection it will be observed that the hob 32 is mounted on and snugly fits an elongated shank 460. The shank 460 extends axially through the central bore of hob 32 and the latter is rotatably fixed to the shank by a key 462. Thus, the hob 32 and the shank 460 are rotatably interconnected. At its upper end, the hob 32 seats against a radial flange 464 on shank 460, and the hob 32 is held solidly against the flange 464 by a nut 466 threaded on the lower end of the shank and acting through a spacer sleeve 468 interposed between the nut and the hob. The lower end of the hob-mounting assembly preferably is supported by a guide 470 at the bottom of the hob carrier 24. Specifically, the sleeve spacer 468 extends through and snugly fits a sleeve bearing 472 which supports the assembly properly for rotation and reciprocation. The bearing 472 is detachably fastened to the guide 470 by screws 474. The upper portion of the hob mounting assembly is supported by an upwardly projecting conical extension 476 of the shank 460 which is received within and snugly fits a correspondingly shaped conical recess 478 in the lower end of driving spindle 454. Interengaging parts 480 rotatably interconnect the spindle 454 and flange 464 so that the hob 32 rotates in unison with the spindle. The rotary drive parts 480 are held in engagement by a rod 482 which extends axially through spindle 454. Adjacent its upper end, rod 482 is provided with a radial shoulder 484 which overlies and seats downwardly against the upper end of the spindle. At the lower end of rod 482 is an externally threaded portion 486 which is screwed into the conical extension 476. At the upper end of rod 482 is an octagonal head 488 adapted to receive a wrench or the like for rotating the rod and tightening or loosening the threaded portion 486 in the conical extension 476. It will be readily apparent that the head 488 is readily accessible at the top of the hob carrier 24 to effect ready attachment or removal of the hob-carrying assembly.

In operation of the instant machine, the hob 32 is initially mounted in a raised position so that only the lower portion of the cutting face engages the gear blank 30. During each hobbing operation the hob 32 is moved downwardly a short distance preferably a thousandth of an inch or so. In this manner the hob 32 gradually moves downwardly during successive hobbing operations so that the entire cutting face of the hob is utilized. When the hob reaches the lower limit of its travel, it may either be retracted to its initial position to repeat the cycle or it can be removed from the machine for sharpening and replacement, depending on the exigencies of the particular situation.

The mechanism for advancing and retracting the hob 32 is disposed within an upright, generally cylindrical housing 490 which surmounts the hob carrier housing and is fastened thereto by screws 492. The particular housing here shown has an enlarged upper portion 494 provided with an internal recess 496, and a pair of nut members 498 and 500 fit snugly in the recess. An externally threaded screw 502 is disposed centrally within the housing 490 and the external threads of the screw are engaged with internal threads of nut members 498 and 500.

Bearings 504 and 506 are received within an enlarged recess 508 in the upper end of the screw 502, and the bearings are held solidly against an internal radial shoulder 510 at the bottom of the recess by a bearing retainer 512 which is fastened to the screw by screws 514. Also, the bearings 504 and 506 surround and snugly fit a reduced terminal portion 516 on the spindle 454 and are held solidly against a radial shoulder 518 by a nut 520 on the upper end of the reduced portion 516. From the foregoing, it will be readily apparent that bearings 504 and 506 permit the screw 502 to rotate freely on and independently of the spindle 454 but that they interconnect the nut and the spindle for mutual axial travel. Moreover, the relative rotation between the nut members 498 and 500, and screw 502, causes the screw and spindle 452 to move either upwardly or downwardly, depending upon the direction of rotation.

It is a feature of this invention that the nut members 498 and 500 are adjustable axially relative to each other and on the screw 502 in order to eliminate backlash between the screw and the nut members. To this end a cover 521 is fastened to the upper end of housing 494 by screws 522. The cover 521 surrounds and is spaced radially from the screw 502 so as not to engage or in any way interfere with rotary or axial movement thereof; however, it overhangs the nut members 498 and 500. The nut members 498 and 500 are separated from each other by an intermediate spacer 524, the upper nut member 498 is separated from cover 520 by a spacer 526, and the lower nut member 500 is separated from the bottom of recess 496 by a spacer 528. Both of the nut members 498 and 500 are connected for mutual rotation by a pin 530. The spacers 524, 526, and 528 are dimensioned so that they, together with the nut members 498 and 500, completely fill the recess 496.

In this manner the nut members 498 and 500 can be selectively positioned with respect to each other in the chamber 496 and on the screw element 502 so as to eliminate backlash between the nut members and the screw element. If, after a period of time, wear between the internal threads of the nut members 498 and 500 and the external threads of screw element 502 causes play or backlash to develop therebetween, the intermediate spacer 524 can be replaced by one sufficiently thick to eliminate the backlash trouble and one or the other of washers 528 and 526 replaced by a spacer of correspondingly reduced thickness.

According to the present invention, screw element 502 and spindle 454 are moved downwardly at a relatively slow rate of speed by rotating the nut members 498 and 500. Since the nut members 498 and 500 are held axially stationary and since the screw 502 is free to move axially, rotation of the nut members causes the screw and the spindle to move vertically. However, since it is desirable to move the spindle and the hob carried thereby downwardly at an exceedingly slow rate of speed, the mechanism for rotating the nut members 498 and 500 must be such as to produce the desired slow rate of movement. On the other hand, it is desirable to retract the hob to its initial position relatively quickly, and a separate mechanism is provided for retracting the spindle.

The drive mechanism for raising and lowering screw 502 comprises an upper housing portion 532 which is fastened to the cap 521 by screws 534. The upper housing section 532 has a top cover 536 detachably fastened thereto by screws 538 and the cover has a central embossment 540 which rotatably supports the hub portion 542 of a worm gear 544. A sleeve bearing 546 within the embossment 540 supports the gear hub for essentially frictionless rotation. The end plate 512 has an upstanding tubular extension 548 which projects axially through the gear 544 and is connected thereto for mutual rotation therewith by a key 550. Thus, it will be seen that gear 544 is connected for direct rotation with the screw 502 and that rotation of the gear rotates the screw inside the nut members 498 and 500 to move the screw axially.

The mechanism for rotatably driving one or the other of nut members 498 and 500 and worm gear 544 comprises a motor 552 mounted on a support 554 attached to the housing 490. The drive shaft 556 of motor 552 extends into a compartment 558 of housing 490 disposed laterally of the nut members 498 and 500 and of the worm gear 544, and the drive shaft carries a shiftable gear 560. The gear shifter 562 is operable by a handle 563 from exteriorly of the housing 490 to move gear 560 back and forth on the shaft 556. In one position, gear 560 engages gear means for driving worm gear 544 so as to move the screw 502 and spindle 454 upwardly, and in another position the gear 560 engages gear means for rotatably driving the nut members 498 and 500 to move the screw 502 and spindle 454 downwardly.

In Fig. 23 the shiftable gear 560 is shown positioned to rotate worm gear 544 so as to raise the spindle 454. More specifically, the gear 560 engages a gear 564 fixed to a shaft 565 and the shaft also carries a worm 566 which meshes with the worm gear 544. Thus, when the shiftable gear 560 is positioned as shown in Fig. 23, it rotatably drives the worm gear 544 to retract spindle 454. Preferably the projecting terminal portion of rod 482 carries a stop 568 which engages the operating arm 570 of a limit switch 572 to stop the motor 552 as soon as the hob 32 has been retracted to its initial position.

In another position, sliding gear 560 disengages the gear 564 and engages a gear 574 carried by a shaft 576. A second gear 578 is fixed on shaft 576 and this gear meshes with a gear 580 on a shaft 582. The latter shaft also carries a worm 584 which engages worm-gear teeth 586 in the periphery of nut member 500. Thus the nut member 500, in effect, functions as a worm gear in its relation to and coaction with the worm 584. Worm gear 584 rotates the nut 500 to lower screw 502 until a stop 588 on the rod 482 engages the actuating arm 570 of limit switch 572 to stop the motor 552.

Figure 24:
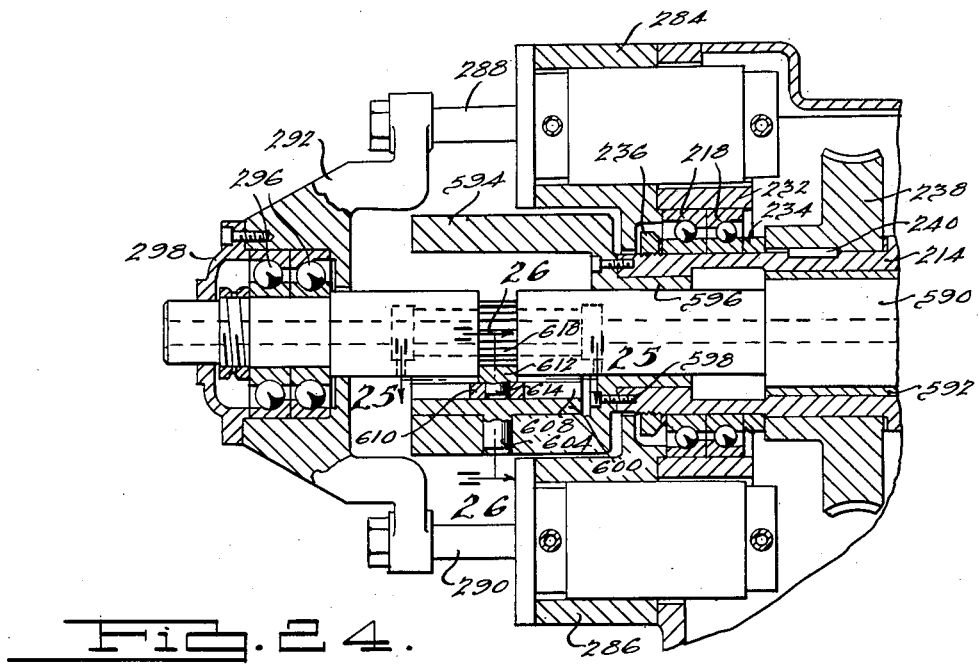
Fig. 24 is a vertical, sectional view showing a fragmentary portion of the headstock and illustrating a modified means for controlling rotary movement of the work during reciprocation thereof in accordance with the lead of the gear teeth.
Figure 25:
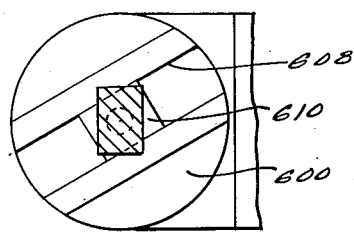
Fig. 25 is a fragmentary, horizontal, sectional view taken on the line 25—25 of Fig. 24.
Figure 26:
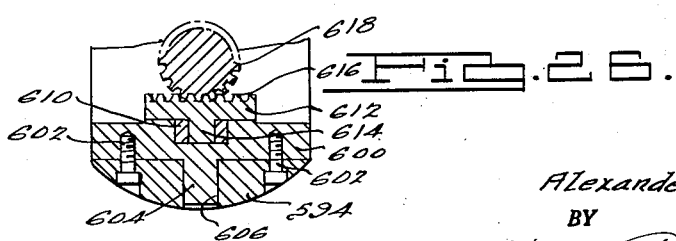
Fig. 26 is a fragmentary, vertical, sectional view taken on the line 26—26 of Fig. 24.

In Figs. 24–26 I have shown an alternative mechanism for adjusting the gear blank 30 angularly or rotatively during the hobbing operation and in accordance with the lead of the gear teeth. If desired, this mechanism can be used in place of the mechanism particularly shown in Figs. 12, 13, and 14 and hereinabove described in its essential details.

In Figs. 24–26 all parts which are identical to or are equivalent in all essential details to corresponding parts in Figs. 12–14 are identified by the same reference numerals. Those parts which are different and which operate differently in the modified construction have their own identifying reference numerals.

In the modified form of the invention now being described, the spindle 590 preferably is formed in one piece. Adjacent its forward or inner end the spindle 590 is supported for rotation by a sleeve bearing 592. The outer end of the spindle 590 is supported by the roller bearings 218 as in the form of the invention first described.

Spindle driving gear 238 is mounted on the sleeve member 214 as in the form of the invention first described and the sleeve member surrounds and retains the sleeve bearing 592. In the instant construction, however, the guide bushing 304 and its adjuncts are replaced by a bifurcated retainer 594 which embraces the spindle 598 behind or rearwardly of the gear-carrying sleeve 214. In the particular construction here shown, the retainer 594 has an inner hublike portion 596 that fits snugly around the spindle 590 and extends into and internally supports the sleeve 14. Screws 598 fasten the retainer 594 to the sleeve portion 214.

As perhaps best shown in Fig. 24, the bifurcations of retainer 594 are disposed on opposite sides of and spaced from the spindle 590. Since the retainer 594 is fastened to the sleeve 214 it rotates with the sleeve.

In order to transfer rotation from the retainer 594 to the spindle 590 a sine bar 600 is fastened to one bifurcation of the retainer 594 by screws 602. The sine bar 600 has a rearwardly or outwardly extending journal 604 supported for rotation in an opening 606 provided in the retainer 594. On the inner face of the sine bar 600 is a groove or way 608, and the sine bar is angularly adjustable about the axis of journal 604. Screws 602 operate in arcuate slots provided in the supporting bifurcation of retainer 594, and the screws can be tightened to hold the sine bar in a selected rotatably adjusted position. Thus, screws 602 not only hold the sine bar 600 fastened to the retainer 594 but they also hold it in a selected rotatably adjusted position. As will be hereinafter apparent, the particular angularly adjusted position of the sine bar 600 is a function of the lead of the gear teeth on the gear blank 30. Thus, the modified construction here shown has the advantage over the construction previously shown and described in that it is not necessary to replace any part or to substitute one part for another when it is desired to adapt the machine for cutting a helical gear blank having teeth of different leads. It is merely necessary to adjust the sine bar 60 angularly in accordance with the particular lead of the gear to be acted upon.

Mounted to travel back and forth in the way 608 is a guide 610, and surmounting the guide is a rack 612 having a rearwardly extending pin 614 journaled in the guide. The rack 612 extends transversely with respect to the spindle 590, and the rack teeth 616 mesh with gear teeth 618 formed on the periphery of the spindle 590.

From the foregoing it will be readily apparent that rotation of the retainer 594 rotatably drives the sine bar 600 and the rack 612 carried thereby; and, since the rack teeth are rotatably interlocked with the teeth 618, the rack and spindle 590 are forced to rotate together. As long as the spindle 590 does not move axially, the retainer 594 and the spindle rotate in unison. However, when the spindle 590 begins to move axially relative to the retainer, the guide 610 moves in the way 608, and when the way is disposed at an angle with respect to spindle 590 as shown in the drawings, the guide has a lateral component as well as an axial component of movement. This lateral component of movement moves the rack 612 transversely of the spindle 590 so that the rack teeth 616 act against the teeth 618 to adjust the spindle 590 angularly independently of and simultaneously with rotation of the spindle. As suggested, the extent of angular adjustment is a function of the lead of the teeth on the workpiece 30 carried by the spindle 590.

In operation, the machine normally is stopped with the clamps 102 and 104 released and the slide 22 retracted to withdraw the hob 32 from engagement with the work 30. At the end of the working cycle the headstock 212 is fully retracted so that the workpiece 30 is in its initial position. With the parts positioned as described, the finished workpiece 30 is removed and a gear blank to be hobbed is inserted in its place.

Although it is not essential to the operation of the machine, suitable means (not shown) preferably is provided for performing the several operations of the machine automatically and in proper sequence. The particular control means employed for this purpose, however, comprise no part of the present invention, and it is contemplated that any suitable or conventional control equipment may be used.

After the gear blank 30 has been mounted in the machine as described in foregoing parts of the specification, the slide 22 is advanced against stop nut 52 to position hob 32 for proper engagement with the workpiece 30, and the clamps 102 and 104 are actuated to hold the slide solidly in the advanced position. The headstock 212 is then actuated to feed the gear blank 30 across hob 32 while the gear blank and the hob are being rotatably driven in properly timed relation. During this operation, the hob 32 is lowered a slight distance in the manner described. After the gear blank 30 disengages the hob 32, the clamps 102 and 104 are released and slide 22 is retracted so as to move the hob 32 away from workpiece 30 and to permit the latter to be returned to its initial position without engaging the hob. This sequence of steps returns the machine to its initial position preparatory to removal of the workpiece.

Having thus described the invention, I claim:

1. A gear-hobbing machine comprising a base, means for mounting and rotatably supporting a gear blank on said base, a slide on the base movable to and from said gear blank, a hob carrier mounted on the slide movable therewith and rotatably adjustable about a fixed axis to position the hob in accordance with the lead of the teeth on said gear blank, a rotary-drive mechanism for said gear blank, a rotary-drive mechanism for said hob including a first worm, and a first worm gear driven by said first worm, said first worm being carried by the slide and located on the same axis as the hob carrier, said first worm gear being carried by and movable with said hob carrier and constantly engaging said first worm in all rotatably adjusted positions of the hob carrier, means for varying the angular position of said carrier including a second worm gear fixed to said carrier and mounted for rotation coaxially with said first worm, and a second worm carried by said slide and actuable to drive said second worm gear and a single drive means for rotatably operating the rotary drive mechanism for said gear element and the rotary-drive mechanism for said hob in properly timed relation, said drive means including a common gearing in the form of a driving worm and a driven gear and said driven gear having separate toothed sections adapted to be circumferentially displaced relative to each other to take up backlash between the worm and the gear whereby to assure rotation of said gear blank and said hob in proper timed relation.

2. A gear-hobbing machine comprising a supporting structure, means on said supporting structure for rotatably driving a gear blank, a hob carrier on said supporting structure in juxtaposition to said gear blank driving means, a single drive means for rotatably operating the rotary drive mechanism for said gear blank and the rotary drive mechanism for said hob in proper timed relation, said drive means including a common gearing in the form of a driving worm and a driven gear and said driven gear having separate toothed sections adapted to be circumferentially displaced relative to each other to take up backlash between the worm and the gear whereby to assure rotation of said gear blank and said hob in proper timed relation, said hob carrier having a vertical hob-carrying portion provided with a horizontal trunnion journaled in said supporting structure and a horizontally extending gear housing, said hob-carrying portion and said gear housing having separate bearing surfaces seating on said supporting structure, said hob carrier being adjustable angularly about said trunnion to position the hob in accordance with the lead of the teeth of said gear blank, means engaging the hob-carrying portion and said gear housing and coacting with said supporting structure to hold the hob carrier in a selected, angularly adjusted position, a hob-driving mechanism including a first worm, and a first worm gear driven by said first worm, said first worm being located on the same axis as the hob carrier, said first worm gear being carried by and movable with said hob carrier and constantly engaging said first worm in all of said adjusted positions of said hob carrier, and means for varying the angular position of said carrier including a second worm gear fixed to said carrier and mounted for rotation coaxially with said first worm, and a second worm carried by said supporting structure and actuable to drive said second worm gear.

3. A gear-hobbing machine comprising a base, means for mounting and rotatably supporting a gear blank on said base, a supporting structure in juxtaposition to said gear-supporting means including a housing, said housing having a first bearing surface on the front of the housing and an upward extension on the rear thereof defining a second vertical bearing surface disposed behind and above said first bearing surface, a hob carrier having a vertical hob-carrying portion disposed in front of said housing and provided with a horizontal trunnion journaled in the housing centrally of said first-mentioned bearing surface, a single drive means for rotatably operating the rotary drive mechanism for said gear blank and the rotary drive mechanism for said hob in proper timed relation, said drive means including a common gearing in the form of a driving worm and a driven gear and said driven gear having separate toothed sections adapted to be circumferentially displaced relative to each other to take up backlash between the worm and the gear whereby to assure rotation of said gear blank and said hob in proper timed relation, said hob carrier also having a horizontally extending gear casing overhanging said housing and engaging said second bearing surface, said hob carrier being adjustable angularly about said trunnion, means fastening the hob-carrying portion to the front of the housing, separate means fastening the gear casing to the upward extension of the housing, means for rotatably driving said hob, and means for varying the angular position of said carrier including a worm gear fixed to said carrier and mounted for rotation coaxially with said trunnion, and a worm carried by said housing and actuable to drive said worm gear.

4. A gear-hobbing machine comprising a base, means for supporting and rotatably driving a gear blank on said base, a slide on the base movable to and from said gear-supporting means, a hob carrier mounted on said slide movable therewith and rotatably adjustable about a fixed axis to position the hob in accordance with the lead of the teeth on said gear blank, a single drive means for rotatably operating the rotary drive mechanism for said gear blank and the rotary drive mechanism for said hob in proper timed relation, said drive means including a common gearing in the form of a driving worm and a driven gear and said driven gear having separate toothed sections adapted to be circumferentially displaced relative to each other to take up backlash between the worm and the gear whereby to assure rotation of said gear blank and said hob in proper timed relation, said hob-driving mechanism including a driven shaft supported for rotation by said base and having a splined end extending into said slide, an internally splined gear slidably mounted on the splined end of said shaft and supported for rotation by said slide, a first worm mounted for rotation in said slide and driven by said gear, and a first worm gear driven by said first worm, said first worm being located on the same axis as the hob carrier and said first worm gear being carried by and movable with the hob carrier and constantly engaging said first worm in all adjusted positions of the hob carrier, and means for varying the angular position of said carrier including a second worm gear fixed to said carrier and mounted for rotation coaxially with said first worm, and a second worm carried by said slide and actuable to drive said second worm gear.

References Cited in the file of this patent

UNITED STATES PATENTS

| Number | Name | Date |
|---|---|---|
| 892,810 | Christensen | July 7, 1908 |
| 905,084 | Lees | Nov. 24, 1908 |
| 1,081,971 | Lees | Dec. 23, 1913 |
| 1,696,660 | Wegner | Dec. 25, 1928 |
| 1,755,916 | Eberhardt | Apr. 22, 1930 |
| 2,132,941 | Flygare | Oct. 11, 1938 |
| 2,316,367 | Schurr et al. | Apr. 13, 1943 |
| 2,481,974 | Bradner | Sept. 13, 1949 |
| 2,484,856 | Purvin | Oct. 18, 1949 |
| 2,528,242 | Praeg | Oct. 31, 1950 |
| 2,537,967 | Carlin | Jan. 16, 1951 |

FOREIGN PATENTS

| Number | Country | Date |
|---|---|---|
| 3,603 | Sweden | June 22, 1891 |
| 4,411 | Great Britain | Mar. 5, 1884 |
| 7,066 | Great Britain | Apr. 9, 1894 |